Jan. 1, 1957
L. McMILLAN ET AL
2,776,174
MOTOR VEHICLE DRIVELINE MOUNTING
Filed Feb. 24, 1955
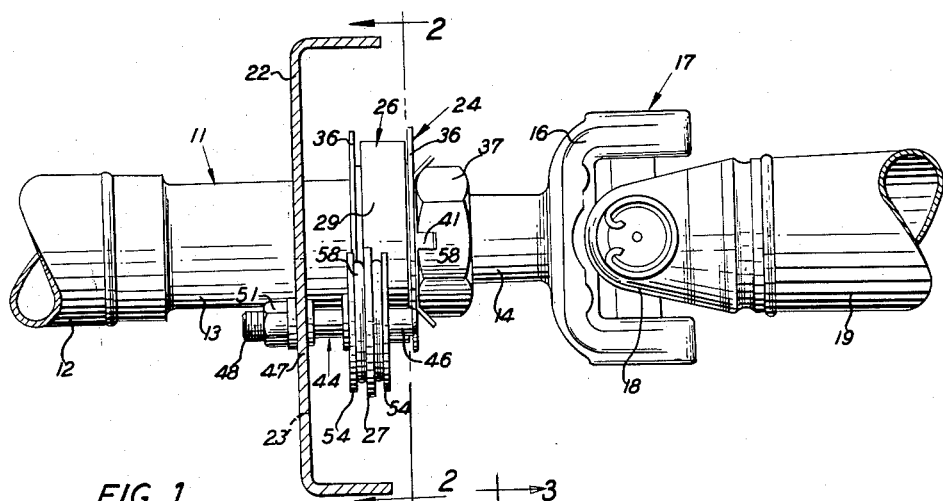
FIG. 1
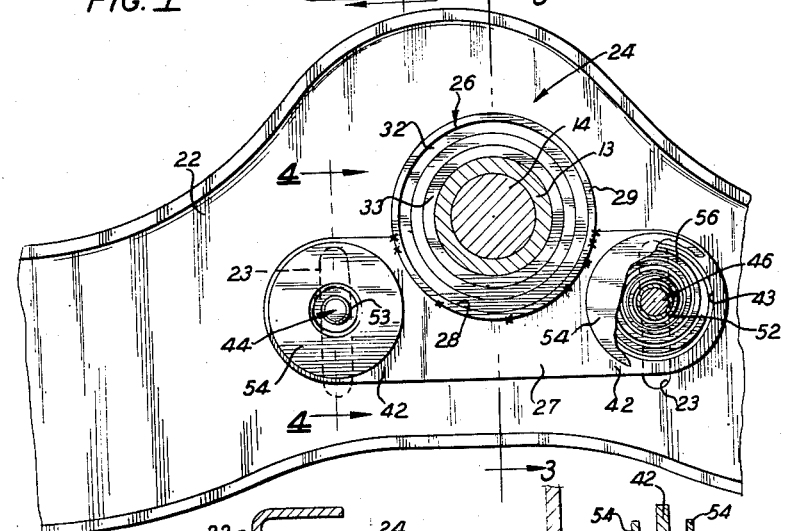
FIG. 2
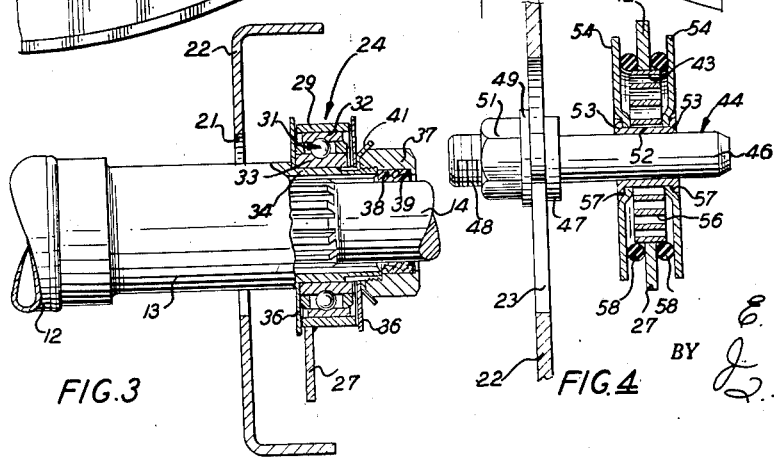
FIG. 3
FIG. 4
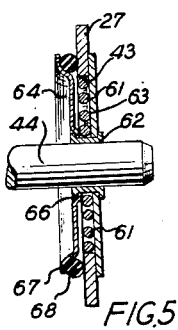
FIG. 5
L. McMILLAN
R. STOCKER
INVENTORS
E. C. McRae
BY J. R. Faulkner
L. H. Oster
ATTORNEYS United States Patent Office 2,776,174
Patented Jan. 1, 1957

2,776,174

MOTOR VEHICLE DRIVELINE MOUNTING

Lachlan McMillan, Allen Park, and Raymond Stocker, Oak Park, Mich., assignors to Ford Motor Company, Dearborn, Mich., a corporation of Delaware Application February 24, 1955, Serial No. 490,384

4 Claims. (Cl. 308—28)

This invention relates generally to a driveline mounting for a motor vehicle, and particularly to a resilient mounting for the center mount of a three joint driveline.

Motor vehicles utilizing front and rear drive shafts and three universal joints between the engine and the rear axle require a mounting supporting a bearing for the driveline adjacent the center or mid-joint. The present invention contemplates the provision of such a mounting utilizing a mounting bracket having a central portion supporting a ball bearing assembly rotatably receiving an intermediate sleeve of the driveline. The mounting bracket also has laterally extending portions suitably apertured to receive and embrace a pair of transversely spaced spiral springs. The central portion of each of these spiral springs is suitably supported upon a longitudinally extending stud adjustably mounted upon a cross frame member. The springs are adequately housed and protected against the entrance of dirt or other foreign matter, with sealing means being incorporated as to provide a proper seal yet permit the necessary deflection. The resulting mounting is relatively simple and inexpensive to manufacture, provides the necessary support and resilient mounting for the bearing assembly, and is of such construction as to be long lasting and trouble free in operation.

Other objects and advantages of this invention will be made more apparent as this description proceeds, particularly when considered in connection with the accompanying drawings, wherein:

Figure 1 is a side elevational view of the central portion of a vehicle driveline of the three joint type incorporating the mounting of the present invention.

Figure 2 is a transverse cross sectional view taken on the plane indicated by the line 2—2 of Figure 1.

Figure 3 is a cross sectional view taken on the plane indicated by the line 3—3 of Figure 2.

Figure 4 is a cross sectional view taken on the plane indicated by the line 4—4 of Figure 2.

Figure 5 is a cross sectional view similar to a portion of Figure 4, but illustrating a modification.

Referring now to the drawing, the reference character 11 indicates generally a motor vehicle driveline assembly having a front drive shaft 12 suitably welded at its rearward end to the forward end of an internally splined sleeve 13. Received within the internally splined sleeve 13 is the splined extension of 14 of the front yoke 16 of a universal joint indicated generally at 17. The universal joint is conventional in construction and includes a rear yoke 18 suitably welded to the rear drive shaft 19. The construction described represents the central portion of a motor vehicle driveline of the type utilizing three universal joints. The joints at the forward and rearward ends of the front and rear drive shafts 12 and 19 respectively are conventional, and are not shown.

The sleeve 13 of the driveline assembly passes through an enlarged opening 21 formed in a frame cross member 22. The cross member is channel shaped in cross section and is secured at its laterally outer ends to the frame side rails (not shown) of the vehicle chassis.

The frame cross member 22 is provided with a pair of laterally spaced vertically extending slots 23, with the slots 23 being spaced equal distances on opposite sides of the center opening 21.

The reference character 24 indicates generally a mounting assembly for rotatably mounting the sleeve 13 of the driveline upon the frame cross member 22. A mounting bracket 26 is provided, and comprises a flat plate 27 having a semicircular recess 28 formed in its upper edge to receive an annular ring 29 which is suitably welded thereto to form a unit. If desired, the mounting bracket 26 may be of unitary construction with the ring 29 being integrally formed with the plate 27 in a stamping operation, in which case a flange would probably be provided on the periphery of the ring portion.

The ring 29 of the mounting bracket 26 houses a ball bearing assembly 31 having an outer race 32 received within the ring and an inner race 33 sleeved upon a reduced portion 34 of the sleeve 13. Sealing washers 36 are provided at opposite sides of the ball bearing assembly 31 to properly seal the unit.

The reduced portion 34 of the sleeve 13 is externally threaded at its end to receive a lock nut 37 holding the bearing assembly in place upon the sleeve. A seal 38 is carried by the lock nut 37 for engagement with the splined extension 14 of the universal joint 17, and a retaining washer 39 holds the seal in place. A lock washer 41 completes the assembly.

As previously mentioned, the plate portion 27 of the mounting bracket 26 is vertically positioned and has a pair of flanges 42 extending laterally outwardly in opposite directions from the central portion of the plate. Each of the flanges 42 is formed with a circular aperture 43 therein, for a purpose to be seen hereinafter.

The frame cross member 22 supports a pair of longitudinally extending studs 44. Each stud has a cylindrical shank 46, an enlarged collar 47 formed integrally therewith, and a threaded end portion 48. The threaded end portion 48 of each stud extends through one of the vertical slots 23 formed in the frame cross member 22, with the integral collar 47 abutting the side of the vertical web of the frame member. A washer 49 and nut 51 complete the assembly and enable each stud 44 to be rigidly supported upon the frame cross member 22, yet capable of vertical adjustment.

As best seen in Figure 4, a hub 52 having end flanges 53 is sleeved on the shank portion 46 of each stud 44. The flanged ends 53 support and retain a pair of circular retaining discs 54 with a flat spiral spring 56 being positioned therebetween. The inner convolution of the spring 56 is seated upon the hub 52. It will be noted that the radially inner portions of the flat discs 54 are dished toward each other to form center portions 57 engaging opposite sides of the inner convolution of the spiral spring and held in assembled relationship therewith by means of the end flanges 53 of the hub 52. This arrangement provides clearance between the discs 54 and the remainder of the spiral spring 56.

The outer convolution of the spiral spring 56 is received within the circular opening 43 in the plate portion 27 of the mounting bracket, and a pair of annular sealing rings 58 of circular cross section are provided to form a seal between the discs 54 and the plate portion 27 of the mounting bracket. The sealing rings embrace the outer convolution of the spiral spring, and are effective in sealing the assembly while permitting the necessary relative movement between the parts thereof as the spring deflects.

It will be noted that the construction described above provides a bearing support for the driveline 11 adjacent the mid-joint thereof, providing the proper support and control therefor while at the same time cushioning the mounting and accommodating deflection radially of the driveline. The complete bearing assembly is also capable of axial movement as necessary by reason of the sliding connection between the shanks 46 of the studs 44 and the hubs 52 supporting the spiral springs 56. A certain amount of axial cushioning effect, as well as sealing, is obtained by means of the resilient sealing rings 58.

Figure 5 illustrates a modification of the invention in which a spiral spring 61 is provided which is formed of wire stock rather than flat stock as in the case of the spring 56 shown in Figure 4. Here again the spiral spring 61 is seated upon a flanged hub 62 mounted upon the stud 44, and the outer convolution of the spring is received within the circular opening 43 in the flat portion 27 of the mounting bracket. A flat circular disc 63 is provided at one side of the spiral spring 61 while a formed disc 64 is provided at the opposite side thereof. The formed disc 64 is dished adjacent its inner periphery at 66 to engage the inner convolution of the spiral spring and to be received between the flanged ends of the hub 62, while at its outer periphery the disc 64 is provided with an axial offset peripheral flange 67 to receive a resilient rubber sealing ring 68 between the offset flange and the plate portion 27 of the mounting bracket. It will be apparent that this modification functions in a manner similar to that shown in Figures 1 to 4 inclusive.

It will be understood that the invention is not to be limited to the exact construction shown and described, but that various changes and modifications may be made without departing from the spirit and scope of the invention, as defined in the appended claims.

What is claimed is:

1. A mounting for supporting a motor vehicle driveline upon a vehicle frame member, comprising a mounting bracket having a vertical plate portion extending laterally of said vehicle and an annular ring embracing the vehicle driveline, a bearing assembly mounted within said ring portion and supporting said driveline, the plate portion of said mounting bracket having flanges extending laterally on opposite sides of said driveline with each of said flanges being formed with a circular aperture therein, a flat spiral spring mounted within each of said circular apertures, a hub sleeved within the inner convolution of each said flat spiral springs, a stud mounted upon said mounting bracket in alignment with each of said hubs and having a projecting portion extending therethrough, a pair of retaining discs sleeved upon each of said hubs and enclosing each of said spiral springs, and a resilient rubber sealing ring between each of said retaining discs and the adjacent portion of the laterally projecting flange of the plate portion of the mounting bracket to provide a sealed chamber for each of said flat spiral springs.

2. The structure defined by claim 1 which is further characterized in that each of said studs extends through a vertical slot in said vehicle frame member for vertical adjustability, and each of said hubs is provided with end flanges retaining the annular retaining discs in engagement with the inner convolution of the spiral spring.

3. A mounting for supporting a motor vehicle driveline upon a vehicle frame member, comprising a mounting bracket having a flat plate portion extending vertically and an annular ring portion centrally threeof, a bearing assembly supported within said ring portion and receiving said driveline, the plate portion of said mounting bracket being provided with a pair of laterally spaced circular apertures therein, a spiral coil spring received within each of said apertures, a hub supporting the inner convolution of each of said spiral coil springs, a pair of studs carried by said frame member and extending generally generally parallel to the axis of said driveline and through said hubs, a flat disc sleeved upon each of said hubs and engaging one side of said flat plate portion of said mounting bracket, a second retaining disc on the opposite side of said spiral spring sleeved on said hub, the outer periphery of said second retaining disc having an axially offset peripheral portion, and a resilient ruber sealing ring located between the offset portion of said second retaining disc and the adjacent side of the plate portion of said mounting bracket to form a seal therewith.

4. A mounting for supporting a motor vehicle driveline upon a vehicle frame member, comprising a mounting bracket, a bearing assembly carried by said mounting bracket and supporting said driveline, said mounting bracket having a pair of apertures formed therein radially offset from the axis of said driveline, a spiral spring received within each of said apertures, a hub provided for sealing the inner convolution of each of said springs, a pair of studs carried by said frame member and extending generally parallel to the axis of said driveline and through said hubs, a pair of retaining discs at opposite sides of said spiral springs, and sealing means between the outer peripheries of said discs and the adjacent portions of said mounting bracket.

References Cited in the file of this patent
UNITED STATES PATENTS

| | | |
|---|---|---|
| 2,118,550 | D'Aubarede | May 24, 1938 |
| 2,465,785 | Berno | Mar. 29, 1949 |
| 2,674,330 | Feil | Apr. 6, 1954 |